United States Patent [19]

Feuer et al.

[11] Patent Number: 5,693,279

[45] Date of Patent: Dec. 2, 1997

[54] STARCH ACETATE AND BLENDS THEREOF WITH METAL CHELATES

[75] Inventors: Bernice I. Feuer, Berkeley Heights; John M. Bronk, Washington, both of N.J.

[73] Assignee: Hoechst Celanese Corp., Somerville, N.J.

[21] Appl. No.: 614,708

[22] Filed: Mar. 13, 1996

[51] Int. Cl.[6] ................................................. D01D 5/04
[52] U.S. Cl. ................. 264/204; 106/162.7; 264/211.11
[58] Field of Search ............................. 264/204, 211.11; 106/162.7

[56] References Cited

U.S. PATENT DOCUMENTS

| | | | |
|---|---|---|---|
| 2,362,182 | 11/1944 | Baker | 106/170.47 |
| 5,446,140 | 8/1995 | Maheras et al. | 106/162.7 |

*Primary Examiner*—Leo B. Tentoni
*Attorney, Agent, or Firm*—Mary E. Bak

[57] ABSTRACT

Filaments characterized by enhanced tensile strength, which are composed of starch acetate or a blend of starch acetate and cellulose acetate and metal chelates, are provided. Also provided are methods for varying the viscosity of a starch acetate solution or starch acetate and cellulose acetate solutions in the production of fibers and cigarette tow.

15 Claims, 1 Drawing Sheet

STARCH ACETATE AND BLENDS THEREOF WITH METAL CHELATES

FIELD OF THE INVENTION

The present invention relates to the field of the preparation of fibers, films and plastics from starch acetate and cellulose acetate.

BACKGROUND OF THE INVENTION

The preparation of cigarette tow, textile filaments, film and plastics from cellulose acetate is known. However, cellulose acetate derived from wood pulp or cotton linters is expensive, and requires the use of large amounts of solvent in processing, resulting in high recovery costs and, often, environmentally-undesirable emissions.

Attempts to solve the cost problem associated with the use of cellulose acetate have been addressed in the art by blending starch acetate with cellulose acetate. See, e.g., U.S. Pat. No. 5,446,140.

Dry starch is generally a 25:75% mix of linear amylose and amylopectin macromolecules composed of D-glucose units. The amylose is a relatively linear polymer of D-glucose units joined by $(1{\rightarrow}4)$-$\alpha$-D links and the amylopectin is a branched molecule with $(1{\rightarrow}4)$-$\alpha$-D links and $(1{\rightarrow}6)$-$\alpha$-D links at the branch points. The average molecular weights for amyloses and amylopectins from several starches are 100,000–210,000 for amyloses and 1,000,000–6,000,000 for amylopectins.

Starch based polymers, such as starch acetate, have been known to be desirable and biodegradable reactants for the development of food products, fibers, filaments, plastics and other products. Starch acetates may have either a low ($\leq 1$) or high ($\sim 2$–3) degree of substitution (DS). DS is determined by the number of free hydroxyls on the amylose and amylopectin units of the starch. Various methods of making starch acetate include treating granular starch with acetic acid or acetic anhydride, either alone or in the presence of a catalyst, such as acetic acid, pyridine, sulfuric acid, or an aqueous alkaline solution. For low DS starch acetate polymers, this method is usually employed at high pH 7–11 and at room temperature. High DS starch acetates are prepared similarly, but with longer reaction times. [See, e.g., Kirk-Othmer, *Encyclopedia of Chemical Technology*, 3rd edit, Vol. 21, (John Wiley and Sons, New York, 1978) pp. 504–505; and *Food Chemistry*, 2d edit., Owen R. Fennema, ed., (Marcel Dekker, Inc., New York, 1985) pp. 118–120].

What is needed in the art is an improved method of making fibers from starch acetate, cellulose acetate, and blends thereof, particularly a method which permits a reduction in the amount of solvent required.

SUMMARY OF THE INVENTION

The present invention provides a method of producing filaments, fibers, film and plastics having enhanced tensile factor as compared to such materials produced by conventional methods. Advantageously, this method also permits the production of filaments and the like with the use of smaller amounts of solvent than required by prior art methods. The method of the invention involves mixing a metal chelate into a solvent solution into which starch acetate and, preferably, a blend of starch acetate and cellulose acetate, is dissolved, so as to produce a filament or fiber. In a preferred embodiment, the metal chelate is mixed into the solvent solution in an amount of between about 0.01%, by weight, to about 4%, by weight, based on the total weight of solids in the solution.

In another aspect, the present invention provides a filament characterized by enhanced tensile strength comprising starch acetate cross-linked with metal chelates. Preferably, the metal chelate is bis(ethyl acetoacetate diisopropoxide) titanium.

In yet another aspect, the present invention provides yarn containing filaments produced according to the method of the invention.

In still another aspect, the present invention provides cigarette filters containing filaments produced according to the method of the invention.

Other aspects and advantages of the present invention are described further in the following detailed description of the preferred embodiments thereof.

DETAILED DESCRIPTION OF THE INVENTION

Figure 1:
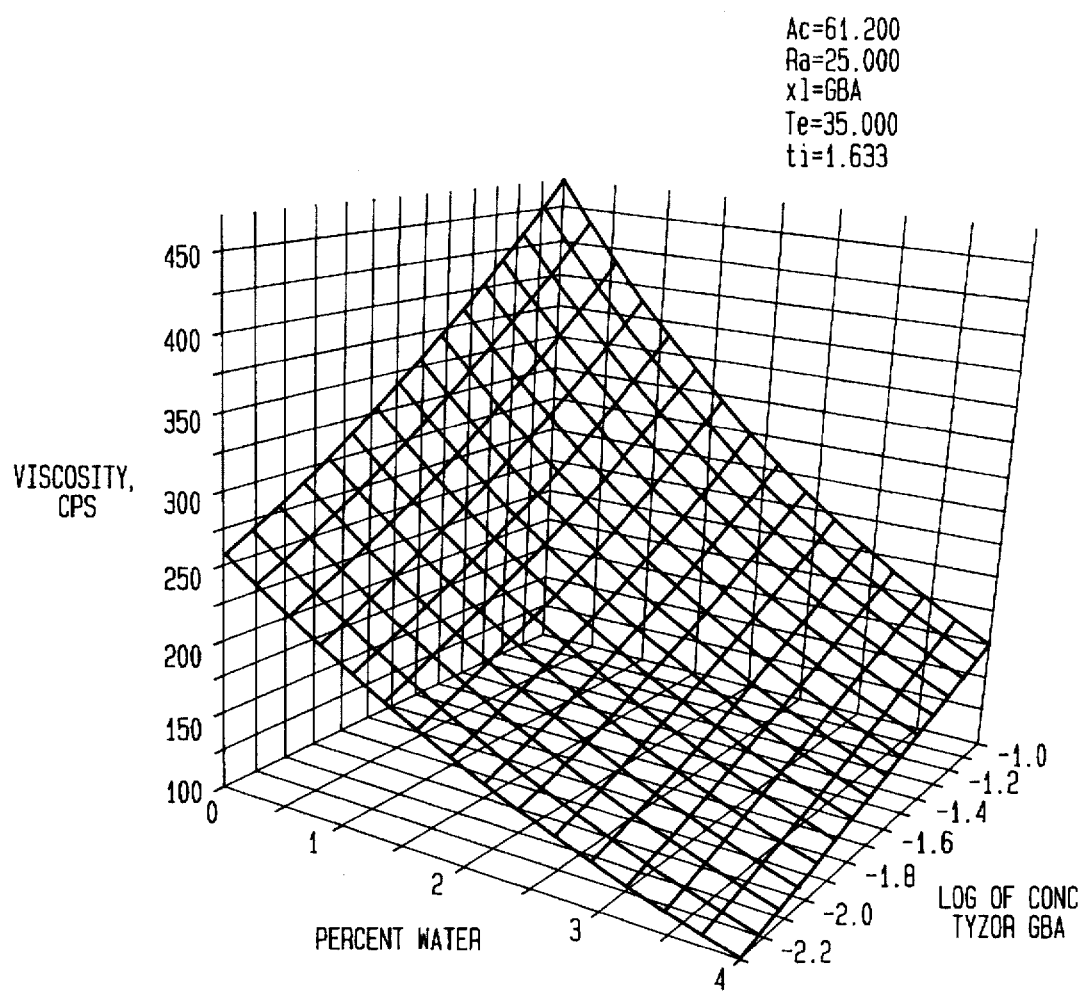
FIG. 1 is a multi-linear regression plot illustrating the response surface of viscosity versus percent water versus the log of the concentration of an exemplary titanium metal chelate. In this plot, the acetyl value (Ac)=61.200; the ratio of starch acetate to cellulose acetate by weight=25:75; the metal chelate was titanium acetyl acetonate diisopropoxide, the temperature was 35° C., and the time of the study was approximately 1 hour, 40 minutes.

The present invention provides a method of producing fibers, filaments, yarn, cigarette tow, and the like of starch acetate, or a blend of starch acetate and cellulose acetate, which are characterized by enhanced tensile factor as compared to such filaments of comparable denier produced by prior art methods. The method of the invention involves adding a metal chelate to the spinning dope for the above blends.

According to the method of the invention, a metal chelate is mixed into the solvent solution of the starch acetate or cellulose acetate/starch acetate blend in an amount between about 0.01%, by weight, to about 4%, by weight, based on the total weight of solids in the solution. Preferably, water is added to compensate for any undesired increase in viscosity. There is a nonliner relationship between the solution viscosity and the percent of water in the acetone. As water is increased at any given metal chelate concentration, the viscosity decreases. The viscosity of the solution at a given water concentrate will increase in a nonlinear manner when plotted against the log of the metal chelate concentration. For example, FIG. 1 shows that for a 20% wt/vol solution consisting of 25:75 starch acetate:cellulose acetate, where the starch acetate has an acetyl value of 61.2, the viscosity of the solution with a titanium acetyl acetonate diisopropoxide concentration of 0.0063 wt percent, the viscosity of the solution can vary from 260 to 100 centipoise by the addition of 0 to 4 percent water. For example, with 0.25% titanium acetyl acetonate diisopropoxide, the solution is preferably spun with about 4% water. Although the viscosity of this solution is greater than the viscosity without the metal chelate, it can still be successfully spun. In a preferred embodiment, the metal chelate is mixed into the solvent prior to the addition of the starch acetate or cellulose acetate.

As defined herein, the metal chelate may be selected from any appropriate metal chelate of the general formula:

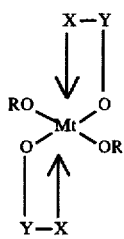

where X is a group containing an oxygen or a nitrogen; the arrows indicated above show the weak internal bonding of the carbonyl oxygen to the metal ligand.

Y is a C2 to C3 alkenyl group;

R is an alkyl group of C1 to C6 carbons in length; and

Mt is a transition metal which can take on a valence of +4.

Preferably, the metal chelate is a titanium chelate. Particularly desirable titanium chelates include, e.g., bis(ethyl acetoacetate diisopropoxide) titanium (IV), titanium acetylacetonate diisopropoxide, and bis(ethyl acetoacetate diisopropoxide) zirconium.

Without wishing to be bound by theory, the inventor believes the present method is advantageous for the following reasons. Strength is developed during the dry spinning process when the concentration of the water in the spinning dope (solution) decreases. Water competes with the unreacted hydroxyl groups that remain on the starch acetate (SA) or cellulose acetate (CA) for binding sites on the chelates. The method of the invention is advantageous because it permits the percentage of solids in the spinning dope to be increased, thus increasing the amount of fiber which can be spun, without increasing the amount of solvent (e.g., acetone) which is required. The reduction in the amount of solvent required reduces recovery costs and emissions and thus provides both environmental and cost benefits.

The term "solvent" refers to acetone, methylethyl ketone, methylene chloride/methanol, glacial acetic acid or any suitable solvent which is capable of dissolving the forementioned cellulose acetate, starch acetate or any combination thereof. The preferred solvent for use in the method of the invention is acetone.

A. Starch Acetate and Cellulose Acetate

Methods of producing starch acetate, or blends of cellulose acetate and starch acetate are well known to those of skill in the art. Alternatively, these materials may be purchased from a variety of commercial sources.

The term "starch acetate" refers to starch which has been acetylated to a degree of substitution (DS) between about 1 to about 3 with an acetyl value of about 20% to about 70%. In a currently preferred embodiment, the DS is 2–3 and the acetyl value is about 42–63.5%.

As used herein, "acetyl value" refers to the weight percent (wt %) of acetic acid per unit measure of starch acetate. For example, an acetyl value of approximately 62.5 is equivalent to a DS of 3.0.

As used herein, high molecular weight starch acetate refers to starch acetate having ≧ about 20%, and preferably at least about 35%, high molecular weight carbohydrates as determined by size exclusion chromatography. Degradation of starch acetate is defined as a decrease in the molecular weight of the polysaccharide(s). A "high molecular weight" starch acetate is defined as that which will elute from two Zorbax PSM bimodel columns (25×6.24 mm) in less than 6.0 minutes using acetone as the mobile phase at a flow rate of 1 mL/min. Polystyrene standards are typically used to generate a molecular weight calibration plot. For example, a polystyrene sample with a molecular weight of 207,700 has a retention time of ~6.9 minutes. In this case, starch acetates with longer retention times are considered to have low molecular weights and those with shorter retention times are considered to have high molecular weights.

Any corn, potato, grain or other suitable starch may be used as the starting material for producing high molecular weight starch acetate. The starch may contain amylose and amylopectin in any suitable ratio. Currently, the preferred starting material is a relatively inexpensive corn starch, which has an amylose to amylopectin ratio of approximately 3:7. However, other starches and corn starches having other ratios can readily be selected by one of skill in the art. For example, waxy maize corn starch which is 100% amylopectin and Hylon VII™ starch which is 70% amylose may also be used, but are currently less preferred because of their expense.

In a preferred embodiment, the starch acetate is synthesized by adding starch to a carboxylic acid, adding chilled acetic anhydride, then adding the desired esterification catalyst over about 10 minutes. The mixture is then heated to about 75°–95° C. for about 2 to about 3 hours, and preferably to about 85° C. for 2–2.5 hours. The resulting product is starch triacetate, formed by the reaction of acetic acid and acetic anhydride, using as a catalyst an alkyl or aryl sulfonic acid or methanesulfonic acid (MSA). In a preferred embodiment, the catalyst is MSA.

Although less preferred, other suitable starch esters may be substituted for starch acetate. Exemplary suitable starch esters include, without limitatation, starch acetate butyrate, starch acetate stearate, starch acetate decanoate, starch acetate palmitate, and starch acetate propanoate.

In addition to acetic acid, one of skill in the art could readily select other suitable carboxylic acids for use in esterifying the starch. Suitable carboxylic acids include those which are liquids at room temperature. Examples of such carboxylic acids include, propionic acid, n-butanoic acid, 2-methylpropanoic (isobutyric) acid, n-pentanoic (valeric) acid), 3-methyl butanoic (isovaleric) acid, hexanoic acid, 2-methyl pentanoic acid, 3-methyl pentanoic acid, n-heptoic acid, cylohexanoic acid, formic acid, mixed acids of acetic and butyric acid, acetic and formic acid, and acetic and propionic acids.

Similarly, one of skill in the art may readily substitute another carboxylic anhydride for acetic anhydride. A suitable carboxylic anhydride may be selected from among those which are liquid at room temperature. Exemplary suitable carboxylic anhydrides include propionic anhydride, n-butyric anhydride, trifluoroacetic anhydride, crotonic anhydride, and n-heptanoic anhydride.

Suitable catalysts for the esterification reaction of starch include acid catalysts which do not generate oxidization products or depolymerize the starch. Such catalysts include alkyl or aryl sulfonic acids. In a currently preferred embodiment, methane sulfonic acid (MSA) is the catalyst.

However, included among suitable alkyl sulfonic acids are ethane sulfonic acid, 2-propane sulfonic acid, 1-propane sulfonic acid, 2-methyl-1-propane sulfonic acid, 1-butane sulfonic acid, 3-methyl-1-butane sulfonic acid, 1-heptane sulfonic acid, and trifluoromethane sulfonic acid. Exemplary aryl sulfonic acids include toluenesulfonic acid, benzene sulfonic acid, and 2,4-dimethylbenzene sulfonic acid.

Optionally, a co-catalyst may be used in the esterification reaction for starch. Desirably, this co-catalyst enhances cross-linking of the starch ester without substantially affecting its solubility, e.g., in acetone. Preferably, this co-catalyst is a phosphoric acid or other phosphate ester. Suitable phosphate esters include pyrophosphate, trisodium phosphate, and the like. The second catalyst (or co-catalyst) may be added with the first catalyst, or at a later stage in the reaction. For example, the phosphoric acid may not be added until the reactants have already been heated to about 70° C. to about 90° C., and preferably about 85° C. for about 10 minutes to about 2.5 hours. If used, the phosphoric acid is most preferably added about 45 minutes after the reactants have reached about 85° C. The preferred ratio of MSA:phosphoric acid, based on molar ratios, is between 0.5:1.0 to 50:1.0. The preferred range based on the volumetric ratios for 99% MSA and 85% o-phosphoric acid is between 0.3:1.0 to 80:1.0 MSA to phosphoric acid.

In another aspect of the production of starch acetate, the catalyst, e.g., MSA, is diluted with acetic acid and slowly metered in once the reaction has reached between about 75°–90° C. For example, it is desirable to add the catalyst (or catalysts) over a period of an hour after the reaction has been heated to approximately 80° C. In contrast, during the fast addition, all of the catalyst is added to the reaction within 5–15 minutes while that reaction is below 40° C.

The starch acetate is retrieved using conventional means. For example, the starch acetate may be precipitated by pouring or adding the reaction mixture (prior to cooling) to water or a solution of dilute acetic acid. The unreacted reactants are removed by washing. One of skill in the art can readily determine alternative means for recovering the starch acetate and these methods do not limit the present invention.

The term "cellulose acetate" refers to any conventional wood pulp, cotton or any other suitable cellulose material being acetylated by organic acids to a degree of substitution ranging between 1.0 to 3.0 with an acetyl value of 20 to 62%. Alternatively, cellulose acetate may be produced using conventional methods. See, Kirk-Othmer Encyclopedia of Chemical Technology—Fourth Edition, Vol. 5, Wiley-Interscience Publ., John Wiley & Sons (1993).

The term "starch acetate blend", as used herein refers to combining, optionally by use of a solvent, starch acetate with any cellulose esters with organic or inorganic acids and with mixtures of cellulose esters and other polymers.

B. Method of Producing Filaments, Yarn and Tow of Increased Tensile Strength The present invention also provides a process for making spun yarn or cigarette tow from the blended starch acetate and cellulose acetate, with a metal chelate cross-linking agent. This method involves mixing the metal chelate into a suitable solution. Such a solution may be acetone, or the solvent to be used for dissolution of the starch acetate and/or cellulose acetate. In a preferred embodiment, the solution is a mixture of acetone and water. The acetone:water are present in a ratio of between about 99:1 to about 90:10 vol/vol. Preferably, the metal chelate is mixed into this solvent solution prior to the addition of starch acetate and/or cellulose acetate, which may be added separately or in a mixture. Preferably, the weight ratio of starch acetate:cellulose acetate is between 5:95 to 95:5, and more preferably between 10:90 to 95:5.

The starch acetate and/or cellulose acetate blends are then processed essentially according to known techniques. See, e.g., U.S. Pat. No. 5,446,140, which is incorporated by reference herein. Briefly, starch acetate and/or cellulose acetate are dissolved in the solvent solution, mixed, filtered and the resultant blend is spun in a spinning cabinet. Any type of spinning which is routinely used in the preparation of cellulose acetate or starch acetate is contemplated. These include dry spinning, wet spinning and melt spinning.

An alternative method to prepare the blend is to co-precipitate a cellulose acetate and starch acetate reaction mixture in water in the proper ratio already in acetate manufacturing and then to follow routine cellulose acetate preparation steps including spinning. The dope temperature should be maintained at about 50° C. to about 95° C. with a downdraft airflow temperature in the spinning cabinet held at about 50° C. to about 100° C. to remove the solvent from the spun yarn by evaporation.

Solvents suitable for the process of this invention are any nonaqueous solvents capable of creating an extrudable dope. Preferably the solvent will be chosen such that it is capable of total solubility of cellulose acetate and starch acetate. Examples of such solvents include volatile, nonaqueous liquids such as low molecular weight aldehydes and ketones, hydrocarbons and halogenated hydrocarbons, esters and ethers. Examples of solvents expressly capable of solubilizing cellulose esters are provided in U.S. Pat. No. 2,362,182, incorporated by reference herein. Those solvents include acetone, ethyl formate, propyl formate, and combinations thereof. Other suitable solvents include acetic acid, methylene chloride, methanol, and combinations thereof. The currently preferred solvent is acetone.

One major use of the starch acetate/cellulose acetate blends of the invention is in flake to be made into cigarette tow for use in cigarette filters. Particularly, the inventor has found that blended fibers made according to the invention have increased tensile factor, as compared to comparably sized blended fibers made according to prior art methods. Thus, the blended fibers of the invention are less likely to break during the process of making cigarette filters on a filter rod making machine. Briefly, this is done by making a tow band of an aggregate of thousands of individual fibers, which are then shaped into a cylinder and surrounded with paper to form the filters. Other uses will be readily apparent to those of skill in the art.

These examples illustrate the preferred methods for preparing the fibers of the invention. These examples are illustrative only and do not limit the scope of the invention.

EXAMPLE 1

Comparative Studies

In the following studies, blends of SA:CA (25:75) were spun into fiber with and without titanium acetyl acetonate diisopropoxide [Tyzor GBA™] pseudo-crosslinking agent using the following process.

Mixtures consisting of the blends of cellulose acetate (CA) (AV=~53) and starch acetate (AV=45), with the indicated cross-linkers, were dissolved in acetone in the percentages provided in Table 1 below and fed through a high shear mixer. The resultant stable solution was spun in a conventional CA spinning cabinet and compared to a control of a SA:CA 25:75 without the pseudo-crosslinking agent dissolved in acetone.

In the tables below, the tensile factor of the yarn (TEy$^{1/2}$) is calculated by multiplying the tensile strength by the square root of the elongation factor. The yarn was produced with a feed roll speed of 400 m/min and the dope temperature was maintained between 75°–87° C. The downdraft airflow in the spinning cabinet had a temperature of 70°–85° C. to remove the acetone from the spun yarn by evaporation.

A. Solution Viscosity

The solution viscosity for a blend of 25:75 starch acetate-:cellulose acetate compared to this blend with different concentrations of titanium ethyl acetoacetate diisopropoxide [Tyzor DC™] is given in Table 1 where at 25° C. at 0.05% Tyzor DC, the viscosity has increased 2.3 times and at 0.1% Tyzor DC the viscosity has increased 3.5 times.

TABLE 1

Solution Viscosity of Starch Acetate:Cellulose Acetate 25:75 Blends in 96:4 Acetone:Water at 30% Total Solids

| Soln Temp, C. | No metal chelate | 0.05% Tyzor DC | 0.1% Tyzor DC |
| --- | --- | --- | --- |
| 25 | 1816 | 4157 | 6433 |
| 45 | 714 | 1552 | 2205 |
| 65 | 349 | 671 | 859 |
| 75 | 226 | 442 | 551 |

A 25:75 SA:CA blend containing 0.25% titanium acetyl acetonate diisopropoxide [Tyzor GBA] was prepared and spun. The single fil tenacity value was 1.32; this value was 12% greater than the value for 25:75 SA:CA blends without metal chelate. The elongation was 31 and the TE½ was 7.35.

These values are comparable to standard pure CA fibers. However, a pure CA control that was spun with the blend had a very high value for the tenacity of 1.63, a 29% elongation and a TE½ of 8.91.

B. Tensile Factor

TABLE 2

| | Dope Description | | | |
| --- | --- | --- | --- | --- |
| Run | SA:CA | Solids | Crosslinker | $TE_y^{1/2}$ |
| 4 | 25:75 | 30% | 0.01% Tyzor DC | 3.9 |
| 5 | 25:75 | 30% | SA control | 4.4 |
| 6 | 25:75 | 30% | SA control | 4.2 |
| 7 | 25:75 | 30% | 0.05% Tyzor DC | 4.5 |
| 8 | 25:75 | 30% | 0.05% Tyzor GBA | 4.8 |
| 10 | 25:75 | 30% | $H_3PO_4$ crosslinker | 3.5 |

The tensile factor for 20 filament (fil) yarn was measured for all samples. In Table 2 above, the samples run were starch acetate:cellulose acetate 25:75 in 96:4 acetone:water; controls were run without crosslinkers. Single fil tensile factors are generally about 1 unit higher than for the yarn, and the single fil target is 7.4. The Tyzor GBA at 0.05% appears to give improved tensile factor. The phosphoric acid catalyst gave a lower tensile factor than the controls or Tyzor samples.

C. Yarn and Filament Properties

As illustrated in Table 3 below, samples of 25:75 starch acetate:cellulose acetate at 26.65% solids in acetone:water 96:4 with and without Tyzor GBA were conditioned using a miniature plate and frame filter press and degassed for two days and then spun.

TABLE 3

| Run | | Denier | Tenacity | % Elongation | TE½ |
| --- | --- | --- | --- | --- | --- |
| 20 | SA:CA control | | | | |
| | Yarn | 79.0 | 1.08 | 34.0 | 6.31 |
| | Single Filament | 3.79 | 1.15 | 32.0 | 6.50 |
| 21 | 0.25% Tyzor GBA | | | | |
| | Yarn | 72.8 | 1.16 | 35.8 | 7.04 |
| | Single Filament | 3.47 | 1.27 | 34.7 | 7.48 |

The yarn properties of the fibers containing 0.25% Tyzor GBA had a 7% increase in tenacity, and 11.6% increase in tensile factor. The properties of the single filaments increased by 10.4% in tenacity and by 15% in tensile factor. The Tyzor GBA at 0.25% appears to give the best tensile factor.

D. Elongation and Tensile Factor

Using a single batch of starch acetate:cellulose acetate 25:75 at 30% solids in acetone:water (96:4) containing 0.05% titanium acetyl acetonate diisopropoxide, spinning conditions were varied to show the direction for elongation and tensile factor ($TE^{1/2}$) improvement. Tensile factor correlates with true drawdown ratio (TDDR). The TDDR is the amount of extensional flow in spinning from the diameter after die swell at the spinneret exit to the final fiber diameter taking into account the volume and length reduction due to solvent loss. In the following Table 4, the spinneret hole diameter was 38 microns, the wind up speed was 400 m/min. $_f$=fil data and $_y$=yarn data. (Pure cellulose acetate is too viscous to spin at 30% solids and is usually spun at 26.5% solids.) In column 2, dpf is denier per filament and in column 4, the tensile/elongation factor is provided in grams per denier.

TABLE 4

| Sample | dpf | TDDR | $T/E_f$ (gpd/%) | $TE_f^{1/2}$ | $T/E_y$ | $TE_y^{1/2}$ |
| --- | --- | --- | --- | --- | --- | --- |
| 1 | 3.5 | 4.6 | 1.20/20 | 5.4 | 1.07/19.3 | 4.7 |
| 2 | 2.9 | 5.6 | 1.22/16.7 | 5.0 | 1.10/14 | 4.1 |
| 3 | 4.3 | 3.8 | 1.21/25.5 | 6.1 | 1.04/21.6 | 4.8 |
| 4 | 3.6 | 4.6 | 1.23/22 | 5.8 | 1.07/17.1 | 4.4 |
| 5 | 3.8 | 4.3 | 1.15/19.4 | 5.1 | 1.06/17.7 | 4.5 |

These spinning data show that the spinning conditions can effect the tensile factor of the single fil and the yarn. The die swell in extrusion of the starch acetate:cellulose acetate blend dopes, the ratio die swell to the diameter of the spinneret hole ($D_s/D_o$), was measured to be about 1.9 at typical spinning conditions which is about 10% higher than that of the standard cellulose acetate solutions. This 10% increase in diameter ratio causes a 20% increase in TDDR and could cause more orientation of the fiber skin in spinning and lower break elongation. The fiber properties from starch acetate:cellulose acetate in Table 4 correlate with TDDR and show that difference between single fil and 20 fil yarn tensile properties. At higher TDDR the $TE^{1/2+e e}$ is lower. The best single fil tensile factor ($TE^{+e,fra\ 1/2}$) was 6.1; the corresponding yarn tensile factor was 4.8 at the lowest TDDR. In this run the TDDR was lowered by increasing dpf from 2.9 to 4.3.

Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. A method of producing fibers, filaments, film and plastics having enhanced tensile strength, comprising the steps of dissolving starch acetate into a solvent solution containing metal chelate and retrieving the fibers, filaments, film or plastics formed in the solvent solution.

2. The method according to claim 1, further comprising the step of dissolving cellulose acetate in the solvent solution.

3. The method according to claim 1, wherein the solvent solution comprises acetone.

4. The method according to claim 1, wherein the solvent solution consists of a mixture of acetone and water.

5. The method according to claim 4 wherein the mixture of acetone and water is in a ratio of acetone:water of between 99:1 to 90:10 vol/vol.

6. The method according to claim 2, wherein the weight ratio of starch acetate:cellulose acetate is between 5:95 to 95:5.

7. The method according to claim 1, wherein the metal chelate is mixed in to said solution in an amount of between about 0.01%, by weight, to about 4%, by weight, based on the total weight of solids in said solution.

8. The method according to claim 1, wherein the metal chelate is mixed into the solvent solution prior to the dissolving step.

9. The method according to claim 1, wherein the metal chelate is titanium chelate selected from the group consisting of bis(ethyl acetoacetate diisopropoxide) titanium (IV) and titanium acetylacetonate diisopropoxide.

10. The method according to claim 1, wherein the metal chelate is bis(ethyl acetoacetate diisopropoxide) zirconium.

11. The method according to claim 1 further comprising the step of:

subjecting the solvent solution containing dissolved starch acetate to dry spinning.

12. The method according to claim 1, wherein the starch acetate is produced by a method comprising the step of catalyzing the synthesis of starch acetate from the reaction of (a) a starch, (b) a acetic acid, and (c) a acetic anhydride with an acid catalyst selected from the group consisting of alkyl sulfonic acids, aryl sulfonic acids methane sulfonic acid and other acid catalysts with similar chemical properties, wherein the starch acetate is characterized by at least about 20% high molecular weight carbohydrates and is white in color.

13. The method according to claim 12 wherein the starch acetate is produced by a method further comprising the steps of (d) heating to between 75° C. and 90° C. and (e) slowly adding the acid catalyst to the reaction.

14. The method according to claim 13 wherein said catalyst is selected from the group consisting of methane sulfonic acid, ethane sulfonic acid, 2-propane sulfonic acid, 1-propane sulfonic acid, 2-methyl-1-propane sulfonic acid, 1-butane sulfonic acid, 3-methyl-1-butane sulfonic acid, 1-heptane sulfonic acid, trifluoromethane sulfonic acid, toluenesulfonic acid, benzene sulfonic acid, and 2,4-dimethylbenzene sulfonic acid.

15. The method according to claim 1, wherein the starch acetate is produced by the method comprising the steps of:

heating corn starch, with acetic acid and acetic anhydride in the presence of an acid catalyst selected from the group consisting of alkyl sulfonic acids, aryl sulfonic acids methane sulfonic acid and other acid catalysts with similar chemical properties under conditions at which the reaction reaches exotherm; and precipitating starch acetate from said reaction product, wherein said starch acetate is characterized by at least about 20% high molecular weight carbohydrates, is white in color and is soluble in acetone and water.

* * * * *